United States Patent Office 3,709,859
Patented Jan. 9, 1973

3,709,859
METHOD FOR THE PRODUCTION OF POLY-
ESTERS WITH A NOVEL MULTICOMPONENT
CATALYST
Josef Hrach and Theodor Wimmer, both of Schaftenau
Nr. 76, Tyrol, Austria
Continuation-in-part of application Ser. No. 732,044,
May 27, 1968. This application Aug. 18, 1971, Ser.
No. 172,754
Claims priority, application Austria, June 2, 1967,
A 15,144/67; Sept. 29, 1967, A 8,872/67
Int. Cl. C08g 17/013, 17/015
U.S. Cl. 260—75 R                                    7 Claims

ABSTRACT OF THE DISCLOSURE

Polyesters, such as polyethylene terephthalate are prepared by heating a dicarboxylic acid ester, such as dimethyl terephthalate, with an aliphatic or cyclic diol, such as ethylene glycol, to a temperature in the order of 100° C.–360° C. in the presence of a catalyst containing (a) antimony, (b) lead and (c) calcium, strontium or barium. The catalyst is preferably a mixture of finely divided metals or alloys. The products are characterized by a light color and excellent color and heat stability.

This application is a continuation-in-part application of U.S. Ser. No. 732,044 filed May 27, 1968, and now abandoned.

The invention relates to a process for the production of thermoplastic, injection-moldable polyester molding masses and injection-molded shaped bodies produced from these molding masses with the feature that the molding masses as well as the shaped bodies contain 0.005 to 0.7 percent by weight based on the polymer of an element selected from the group consisting of calcium, strontium and barium. The presence of one of these metals in the injection-molding mass causes the mass to show high crystallizability which leads to easy processing of shaped bodies with a high degree of crystallization, high dimensional stability to heat and high impact resistance.

The production of spinnable thermoplastic polyester molding masses was described about 30 years ago. U.S. Patent No. 2,465,319 must be considered the guiding patent in this field, as it discloses the production of fiber-forming and therefore spinnable thermoplastic polyester molding masses and the production of polyester fibers. This patent further discloses that the production of thermoplastic fiber-forming polyester molding masses can be improved by the employment of metallic catalysts, since the catalyst employed increase the speed of polyester formation. The metals sodium, lithium, potassium, calcium, magnesium, zinc, cadmium, manganese, iron, nickel, cobalt, tin, lead and bismuth are considered to be particularly suitable catalysts. According to the teaching of this patent, good results are also obtained if an alkali metal and one or more metals of the group beryllium, magnesium, zinc, cadmium, copper, silver, aluminum, chromium, molybdenum, manganese, iron, nickel, cobalt, mercury, tin, lead, bismuth, antimony, palladium and platinum are used.

If, however, the polyester spinning masses disclosed in this patent are investigated from the aspects of the requirements of modern spinning technology and stretching technology, that is to say, under application of high pulling-off speeds of the fiber formed and high stretching speeds, respectively, the fiber-forming properties and the properties of the fibers per se are far from adequate. This fact has brought about a large number of catalyst systems intended for the improvement of the processing properties of the polyester spinning mass. Decisive in this field is British Patent No. 740,381 which advocates the use of soluble antimony compounds in the reesterification mixture. This teaching makes possible the production of spinnable polyesters particularly employable in the production of textiles. There are other suggestions, next to that of employing soluble antimony compounds, forming the objects of countless patents, concerning the most diverse catalyst systems, usually in the form of soluble metallic compounds, to be used in the production of polyester melt spinning masses. From this vast number of patents, we select U.S. Patent Nos. 3,028,366 and 3,057,-828, as these patents were taken into consideration in the course of the examination procedure of our copending application Ser. No. 732,044.

U.S. Patent 3,028,366 Engle et al., relates to a catalytic process for the production of colorless, fiber-forming polyester molding masses. According to the teachings of this patent specification, it is necessary to employ pentavalent phosphorous compounds as stabilizers in order to prevent the formation of a discolored polyeseter molding mass. As evident from Tables I, and in particular II, of the patent specification, however, these additions clearly reduce the polycondensation speed in the production of fiber-forming polyesters. A thermoplastic polyester cannot be considered fiber-forming until it has reached an intrinsic viscosity of 0.42 dl./g.

As the patent mentioned above is not directed to the use of certain catalysts, it indicates that all known reesterification catalysts can be employed. In the examples, the use of certain catalyst combinations of zinc- and titanium compounds, magnesium- and antimony compounds, zinc-, lithium- and antimony compounds, lithium- and lead compounds, magnesium-, lead- and antimony compounds, lanthanum- and antimony compounds, manganese- and antimony compounds and the use of a calcium compound or a manganese compound, respectively is described. It is stated in the specification that alkali metals and their hydrides and compounds of calcium, magnesium, lanthanum, manganese and cobalt can be used as reesterification catalysts. As polycondensation catalysts, antimony trioxide and titanium ester are mentioned.

U.S. Pat. No. 3,057,828 (McNeil) suggests the use of bivalent metal antimonites of the group of the antimonites of cadmium, tin, magnesium, manganese, lead, beryllium, calcium, strontium, barium, zinc, mercury, iron, cobalt, nickel, copper, chromium and mixtures thereof for the production of colorless, film- and fiber-forming thermoplastic polyester molding masses. In the examples, a.o.

the use of a mixture of magnesium- and tin antimonite, a mixture of magnesium acetate and tin antimonite, a mixture of manganese oxide, antimony trioxide and lead antimonite together with triphenyl phosphite, a mixture of manganese acetate and magnesium antimonite, a mixture of calcium acetate and tin antimonite, and a mixture of barium acetate and tin antimonite is described. The best results, according to the indications of the above patent specification, are obtained when using the bivalent metal antimonites alone, as the color of the polyester molding masses is adversely affected by further additions. Only when using tin antimonite, it is necessary to use an additional reesterification catalyst. This is why that patent particularly emphasizes the non-equivalence of tin with all other metals and terms as unfavorable combinations of a metal antimonite and an additional reesterification catalyst, or the use of a mixture of two metal antimonites, as this leads to the formation of discolored polyester molding masses. On further investigation of the statements contained in the patent specification, it turns out that when using the catalyst combinations of Examples 3, 4, 11 and 12, as suggested namely, the combinations of magnesium antimonite and tin antimonite, of magnesium acetate and tin antimonite, of calcium acetate and tin antimonite, under the reaction conditions of these examples, an intrinsic viscosity value of 0.59 dl./g., measured in 1% phenol:tetrachloro ethane solutions (1:1) at 30° C., cannot be exceeded. Furthermore, the best sample brightness ascertained is below 70%, the degree of whiteness below 50% when measured according to the CIE system referred to later on. In order to arrive at an evalution of the two patents in relation to the present invention, one must start out from the basis that neither of the two patents mentioned makes even the slightest reference to the injection-molding properties of the polyester masses (film- and fiber-forming) produced. Further on in the description of the subject invention, comparative examples will be given investigating the suitability of the melt spinning masses disclosed in the patents for the production of injection-molded shaped bodies.

In the British patent specification No. 609,795, the production of injection-molded shaped bodies of thermoplastic polyester molding masses is disclosed. The polyester molding masses employed there are described by Whinfield and Dickson in their British patent specification No. 578,079, which is the equivalent to U.S. Pat. No. 2,465,319. British Pat. No. 609,795 already mentions working temperatures of 80 to 150° C. and describes the production of crystalline polyester injection-molded shaped bodies. The mechanical properties of the shaped bodies obtained, however, are not adequate, in particular, the shaped bodies are comparatively brittle.

In the Dutch Offenlegungsschrift NOA 6511.744, it is therefore suggested to use polyester molding masses of high viscosity. The use of highly viscous polyester molding masses, however, leads to difficulties in the crystallization of the injection mold shaped bodies, so that very high mold temperatures must be used. This is why the Offenlegungsschrift mentioned suggests a procedure which has been used for some time for other plastics, namely, to add to the polyester molding masses up to 0.5 percent by weight of a solid, inorganic substance insoluble in the polyester melt of a particle size of less than $2\mu$. This substance is to remain in an unsolved state during the injection mold process, it is to act as a crystallization nucleus in the injection molded article as long as this article is still within the mold and is to bring about the formation of crystalline shaped bodies. If one investigates this suggestion, it is found that the measure suggested brings about merely a very minor improvement in the crystallization behavior and that for attaining a satisfactory degree of crystallization in the injection mold shaped bodies, equally high mold temperatures, namely, temperatures above 140° C. must be applied. This constitutes a grave disadvantage, as many injection mold processors do not have the appropriate apparatuses available, or, respectively, are not accustomed to the application of such high mold temperatures in the injection molding of plastics.

An object of the invention is the creation of a polyester injection molding material which is free of the disadvantages mentioned, which material can be processed into injection molded articles at lower mold temperatures than those of the known polyester spinning materials. The injection molded article prepared according to the instant invention has a homogeneous crystalline structure, a high degre of crystallinity and high thermal stability, as well as high impact resistance with simultaneous excellent color stability.

The injection molded articles can be used, e.g., for the production of instrument panel parts, fittings, gaskets, springs, housings for electrical appliances and hand tools, dishes, parts for household appliances, insulating panels, buttons, bearings, track wheels, cams, valves, cog wheels and cog racks. It is also possible to produce pipes, rods and profiles having a homogeneous crystal structure, a high degree of crystallinity and high thermal dimensional stability by extruding the polyester molding materials of this invention.

The shaped bodies produced according to the invention contain (a) antimony, (b) lead, and (c) a metal of the group consisting of calcium, strontium and barium. Antimony should be present in an amount of between 0.001 and 0.8 percent by weight. Lead should be present in an amount of between 0.005 and 0.7 percent by weight. The alkaline earth metal employed, or mixtures thereof, should be present in an amount of between 0.005 and 0.7 percent by weight. The preferred ranges, however, are between 0.002 and 0.08 percent by weight for antimony, 0.01 and 0.07 percent by weight for lead and 0.01 and 0.06 percent by weight for the alkaline earth metal. The total metal concentration used should preferably be in the range between 0.01 and 0.10 percent by weight. These additives surprisingly give rise to (a) lower mold temperatures in injection molding processes than are possible when using the known polyester spinning masses, and
(b) an injection-molded shaped body having a homogeneous crystal structure.

It is most advantageous to introduce the additives mentioned above to the starting materials for the polyester production since they act as catalysts for the ester interchange reaction and polycondensation reaction. These additives cause the development of polyester masses having extremely high viscosities, which are most desirable for the production of injection molded shaped bodies. For the production of the polyester molding mass a multifunctional ester component is heated with a surplus of multifunctional alcohol component together with the additives mentioned above to 100 to 250° C. The ester component in the instant invention means aromatic dicarboxylic acid dialkyl esters comprising 1 or 2 benzene rings and 8 to 20 carbon atoms, with the alkyl radicals containing 1 to 4 carbon atoms. Preferred are the dialkyl esters of terephthalic acid, of isophthalic acid, of 5-sulfo isophthalic acid, of diphenyl dicarboxylic acid and of 2,6-naphthaline dicarboxylic acid. However, it is also possible to employ the dialkyl esters of difunctional aliphatic dicarboxylic acids containing 4 to 10 carbon atoms, with the alkyl radicals again containing 1 to 4 carbon atoms. Preferred aliphatic dicarboxylic acid esters are the esters of adipic acid and sebacic acid. Of the alcohol components, alkane diols containing 2 to 10 carbon atoms, or, respectively, ethylene glycol, 1,3-propane diol, and 1,4-butane diol, further 1,4-bis[hydroxymethyl]-cyclohexane and 2,2-bis-[4'-β-hydroxyethoxyphenyl]-propane are used. It is also possible to add, next to these difunctional ester and alcohol components, small amounts of branching and cross-linking effect compounds so that the thermoplastic character of the polyester molding mass is retained intact. That is to say, that these components are employed in amounts of up to 1 mol percent in relation to the diester component, but preferably up to 0.1 mol percent. Examples of such ester components with a branching and cross-linking effect are the tri- and multivalent carboxylic acids such as, e.g. tricarballylic acid, trimellitic acid-, dioxybenzoic acid-, tartaric acid- and 2,5-dioxyterephthalic acid esters. Examples of alcohol components with a branching and cross-linking effect are the tri- and multivalent alcohols such as glycerine, erythritol and pentaerythritol.

The acid component of the preferred thermoplastic molding mass according to the invention consists of at least 85 mol percent of terephthalic acid. The alcohol component consists of at least 85 mol percent of ethylene glycol.

Heating of the components is usually effected in an inert gas atmosphere and leads to an ester interchange in the course of which the low molecular alkanol of the dialkyl ester component is distilled off. In this reaction, the omega hydroxy dicarboxylic acid ester is formed.

The additives employed as catalysts can be used in the form of metals, as alloys, or as metallic compounds. When employing them as metals or alloys, it is preferable to use them in the form of powders. It is preferable to employ pulverized metals and alloys with a grain size of less than 200μ and 50μ, respectively. But it is also possible to use the metals and alloys in the form of chips, grains or pieces of wire. There is, however, the further possibility of employing the powders in the form of suspensions or solutions, e.g. in methanol or in a diol such as, e.g., ethylene glycol. This is the preferred form of addition for the alkaline earth metals employed.

The metal alloys may be prepared by melting the metals together in the desired proportions, usually under an inert atmosphere. The alloy melts are then usually pulverized and optionally sifted.

It is also possible to add the catalysts in the form of metal compounds to the starting materials for polyester production. With this procedure, however, it is mandatory to employ metal compounds which are soluble in monovalent or multivalent alcohols. Preferable for this purpose are oxides, hydroxides, monocarboxylic acids salts, e.g. formates or acetates. These metal compounds can be added either directly to the starting materials for polyester production or, to a solution or dispersion of the metal compounds in the monovalent or multivalent alcohol or in a monocarboxylic acid such as, e.g., acetic acid, and to add this solution or dispersion to the starting materials for polyester production.

After distilling off the theoretically calculable amount of alkanol, the reaction mixture is further heated until the diol employed with a stoichiometric excess is distilled off. The operating temperature for this depends essentially on the boiling point of the diol. If all excess diol is removed or if the boiling point of the diol is above 250° C., it is usual at 250° C. to apply a vacuum excluding oxygen in an inert gas atmosphere and to carry out polycondensation, depending upon the melting point of the polycondensate formed, at constant or further increasing temperature up to the desired degree of polycondensation. This, in the production of the viscous shaped bodies according to the invention corresponds to an intrinsic viscosity of more than 0.70 dl./g., preferably more than 0.80 dl./g., measured on the basis of 1% solutions of phenol: tetrachloro ethane 1:1 at 30° C.

The polycondensation temperatures to be adjusted are above the melting point of the polyester, i.e., between 200 and 360° C. the created vacuum below 1 torr. The polycondensation period is interpreted to mean the time between the creation of a vacuum of below 0.5 torr and the point of removal of the vacuum by introduction of dry inert gas, such as, e.g., nitrogen. When the desired polycondensation degree is attained, the finished polycondensate is usually removed in molten form, cooled off and cut. If the polyester molding mass is cooled off by means of water, the thermoplastic polyester molding mass must subsequently, for the purpose of further processing, be dried off to a humidity content of less than 0.02 percent by weight of water, preferably less than 0.01 percent by weight of water. This is done by heating the cut molding mass at temperatures between 80 and 180° C. optionally in an air stream.

During polyester production, all other known steps such as, e.g., the addition of inert material (low-molecular and high-molecular solids), pigments, optical brighteners, stabilizers and fillers, can be effected.

The polyester molding masses obtained are well suited for injection molding and extruding. They are of bright color and display excellent color- and light stability. They are not sensitive to further heat treatment and thermoplastic deformation and show virtually no loss of molecular weight in such processes as melting, granulation and mixing with other polymerisation plastics in the melt. Above all, their crystallization behavior is strikingly different from that of the known moldable polyester spinning masses. When the crystallization behavior of the present thermoplastic molding masses is determined by measuring the crystallization temperature by heating a sample which has been tempered at 300° C. for 3 minutes and then suddenly cooled off and then examining the sample by means of a differential colorimeter DCS–1B Perkin Elmer under heating with a heating rate of 16° C. per minute, it is found that the crystallization temperature lies between 125 and 140° C. (cf. the drawing). The drawing shows a thermogram(abcissa: temperature in centigrades, ordinate: difference of heat capacities of sample and reference material in millicalories per second) of the sample according to the present invention indicating the glass transition temperature ($T_G$), the crystallization temperature ($T_K$) and the melting temperature ($T_S$). The glass transition temperature indicated is the point of inflection in the sudden increase in specific heat in the thermogram. The crystallization temperature indicated is the minimum of the exothermic peak and the melting temperature indicated is the maximum of the endothermic peak. A polymer crystallizes better the lower the crystallization temperature. When comparing the crystallization temperature of the known polyester melt spinning masses with the crystallization temperature of the instant polyester molding masses, it is found that the former show as a rule a crystallization temperature of more than 150° C. This crystallization behavior of the molding material prepared according to the present invention is the reason that the injection molded bodies according to the invention crystallize at considerably lower injection mold temperatures and that the shaped bodies obtained have a homogeneous crystalline structure, which is not the case in processing the spinning melts. It has been found that by forming thoroughly crystallized injection-molded polyester articles, the crystallization temperature of the thermoplastic molding material generally should not exceed 150° C.

The injection mold process is carried out with cut, mainly granular, dried plastic moldable mass. The plastic is condensed under the influence of heat until it undergoes the transition from the solid into a high plastic or liquid state. Subsequently, the liquefied plastic is pressed, or injected quickly and with great force from a cylinder through a nozzle into a mold which is kept closed. The mold is kept at a lower temperature than the plastic streaming in, so that the latter is cooled off and completely solidifies. After a short period of setting, solidification has progressed to such an extent that the mold can be opened and the injection molded part, which has now solidified to dimensional stability, can be removed or expelled. During this processing, the presence of humidity and air must be prevented to the highest degree possible.

For carrying out the injection molding process, either an injection molding machine with a plunger or with a screw plastificator is used. The temperature of the cylinder of the injection molding machine is kept above the melting point of the polyester, so that the plastic is present in the cylinder output zone in a liquid state in order that it may be pressed into the mold. The mold is kept at 20 to 70° C. above the glass transition temperature of the polyester, that means at a temperature slightly above the crystallization temperature. From this, it is evident that in molding polyester masses, the mold temperatures may be kept at 125 to 150° C. The shaped polyester bodies so obtained are of high density (degree of crystallinity), as well as of a high degree of impact resistance, of high thermal dimensional stability and of particularly bright color, a brightness of more than 73% and a degree of whiteness of more than 75% measured according to the CIE System as described in Zeiss "Gebrauchsanleitung für lichtelektrisches Remissionsphotometer Elrepho" (Directions for Use of the Photoelectric Directional Reflectance Photometer Elrepho) and in Kirk Othmer "Encyclopedia of Chemical Technology," vol. 5, page 802, second edition.

The content of ether groups in the polyester bodies is very low. It is below 2 mol percent in relation to the total amount of incorporated glycol component.

The thermoplastic polyester molding masses and polyester injection mold shaped bodies, respectively, are made up of the following monomeric units:

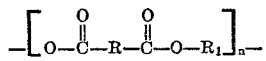

$n$ is an integer larger than 50 and lower than 570 and R is a divalent radical, e.g.,

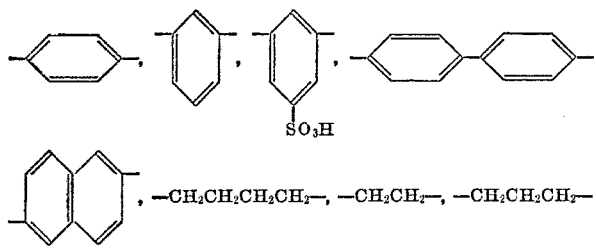

$R_1$ is a divalent radical, e.g.,

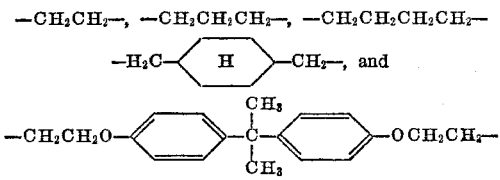

In amounts up to 1 mol percent, the divalent radicals R and $R_1$ can be replaced by the tri- or tetravalent radicals.

R can be replaced by e.g.,

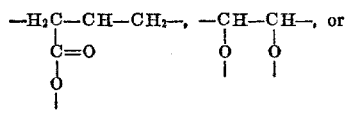

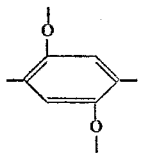

$R_1$ can be replaced by e.g.,

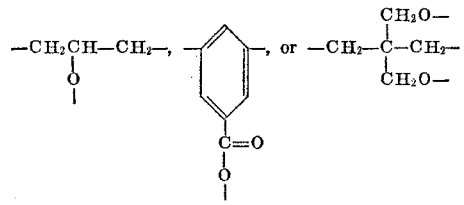

Other advantages of the invention will be evident from the following examples. In the following examples, the parts indicated are parts by weight.

EXAMPLES 1 to 4, 1A, 4A

Polyethylene terephthalate molding masses having intrinsic viscosities of 1.01–1.06 dl./g. measured in 1% solutions of phenol:tetrachloro ethane 1:1 at 30° C. are prepared. These molding masses, under the same injection molding conditions, are worked into small standard rods of the dimensions 4 x 6 x 50 mm. The following properties of the small standard test bars are determined, the density, which is a measure for the degree of crystallinity, the intrinsic viscosity and the thermal dimensional stability.

Polyethylene terephthalate molding masses are prepared by subjecting 3880 parts of dimethyl terephthalate to ester interchange with 2720 parts of ethylene glycol in the presence of variable catalyst concentrations (see Table I) under nitrogen for 4 hours and at a temperature of 100 to 200° C. until the theoretical amount of methanol is distilled off. Distilling off of the excess ethylene glycol is effected by raising the temperature to 250° C. and holding this temperature until distillation is completed. The liquid reaction mixture is transferred to a polycondensation vessel and heated under nitrogen at 265–275° C. and a vacuum below 0.1 torr until an intrinsic viscosity between 0.70 and 0.80 dl./g. is reached. The polyester melt obtained is taken from the polycondensation vessel in the form of a strand, cooled off in water and then cut up into cylindrically-shaped granules of a cylinder height of about 4 mm. and a cylinder diameter of about 3 mm. The moist granules are dried in vacuum for 7 to 10 hours at temperatures of 60 to 180° C. until the moisture content of the granules is below 0.01 percent by weight of water. For further polycondensation, the granules are heated at temperatures between 224 and 226° C. in vacuum in a nitrogen stream for variable periods (see Table I) until an intrinsic viscosity of between 1.01 and 1.06 dl./g. is reached. The crystallization temperatures of the polyethylene terephthalate molding masses obtained are also evident from Table I. Examples 1 to 4 relate to the injection molding masses of the present invention. Example 1A relates to a polyethylene terephthalate molding mass, produced by solid phase polycondensation of a melt spinning mass according to U.S. Pat. No. 3,028,366 (Table II, Catalyst 1, without Modifier). Example 4A relates to a polyethylene terephthalate molding mass produced by solid phase polycondensation of a melt spinning mass obtained according to U.S. Pat. No. 3,057,828 with a catalyst system consisting of 0.04 percent by weight of MgO and 0.02 percent by weight of Pb(SbO$_2$)$_2$, which is closest to the instant invention. The results of Examples 1 to 3 are directly comparable to Example 1A and the result of Example 4 is comparable to the result of Example 4A. Table I shows that the polyethylene terephthalate molding masses, produced with catalyst systems according to the present invention, show clearly lower crystallization temperatuers than the polyethylene terephthalate molding masses produced from melt spinning masses obtained by solid phase condensation.

TABLE I.—PRODUCTION AND PROPERTIES OF POLYETHYLENE TEREPHTHALATE MOLDING MASSES

| Example | Catalyst | Mol percent | Polycondensation time (melt condensation) in minutes | Intrinsic viscosity of the melt condensate (dl./g.) | Polycondensation time of solid phase polycondensation (minutes) | Intrinsic viscosity of the polyethylene terephthalate molding mass (dl./g.) | Crystallization temperature of the polyethylene terephthalate molding mass (degrees C.) | Reference |
|---|---|---|---|---|---|---|---|---|
| 1 | CaO / PbO / $Sb_2O_3$ | 0.052 / 0.009 / 0.020 | 180 | 0.78 | 360 | 1.02 | 138 | |
| 2 | $Sr(OH)_2 8H_2O$ / PbO / $Sb_2O_3$ | 0.052 / 0.009 / 0.020 | 240 | 0.77 | 360 | 1.04 | 140 | |
| 3 | $Ba(OH)_2$ / PbO / $Sb_2O_3$ | 0.052 / 0.009 / 0.020 | 240 | 0.73 | 720 | 1.04 | 136 | |
| 1A | MgO / PbO / $Sb_2O_3$ | 0.052 / 0.009 / 0.020 | 140 | 0.80 | 120 | 1.01 | 155 | U.S. Pat. 3,028,366. |
| | | Percent by weight [1] | | | | | | |
| 4 | CaO / $Pb(SbO_2)_2$ | 0.02 / 0.04 | 305 | 0.74 | 480 | 1.06 | 140 | |
| 4A | MgO / $Pb(SbO_2)_2$ | 0.02 / 0.04 | 180 | 0.79 | 300 | 1.04 | 160 | U.S. Pat. 3,057,828. |

[1] In relation to dimethyl terephthalate.

In addition, the polyethylene terephthalate molding masses of Examples 1A and 4A show a strong yellow coloring. Additions of tributyl phosphate such as suggested in U.S. Pat. No. 3,028,366 or of triphenyl phosphite such as suggested in U.S. Pat. No. 3,057,828 leave the crystallization behavior of the polyethylene terephthalate molding masses unchanged.

Injection mold processing of the polyethylene terephthalate molding masses indicated in Table I Prior to injection mold processing, the granulated polyethylene terephthalate molding masses of Table I are dried for 14 hours at 140° C. in vacuum under less than 1 torr. For preparing the injection mold sample bodies, the oil-heated 12-fold standard test bar form and the Arburg Allrounder 200 injection mold machine are used. The following processing conditions are adhered to for all injection mold tests:

Cylinder temperatures:
  Inlet zone _____° C__ 260
  Compression zone _____° C__ 270
  Outlet zone _____° C__ 290
  Mold temperature _____° C__ 140
  Mold closing time _____seconds__ 60
  Injection time _____do____ 2.0 to 2.5

In addition to the tests with the injection-molded small standard test bars (6 x 4 x 50 mm.), the ability to be released from the mold is also evaluated and incorporated into Table II.

Testing of the injection-molded polyethylene terephthalate shaped bodies

The following properties are determined in the injection molded standard test bars:

(a) intrinsic viscosity
(b) density according to buoyant-force method
(c) thermal dimensional stability The determination of the density is effected according to the well known density gradient method in the density gradient column by means of two mixtures of hexane and carbon tetrachloride of varying density comprising the density range between 1,330 and 1,430. Polyethylene terephthalates of known density are used as standard bodies.

The thermal dimensional stability of the standard test bars is determined by arranging these bars on two knife-like supports which are at a distance of 40 mm from each other. The bar is loaded in the center so that a bending stress of 81.8 kg. per cm.² is created. The bars are heated at a temperature increase of 50° C. per hour, under access of air, to 120° C. The bend is measured in intervals of 3° C. A norm for the thermal dimensional stability is the temperature at which the bend reaches 0.33 mm. after 2 minutes of load application. The higher the temperature for a certain standard test bar, the better its dimensional stability to heat.

For determing the intrinsic viscosity and the density values, two each standard test bars are used. In order to eliminate differences in quality brought about by the molds in which the injection mold specimens are produced, only standard test bars from one set of molds are used.

The test results obtained are summarized in the following Table II:

TABLE II.—TESTING OF THE INJECTION MOLDED SMALL STANDARD TEST BARS OF POLYETHYLENE TEREPHTHALATE

| Example | Ability to be released from mold | Intrinsic viscosity (dl./g.) | Density (g./cm.³) | Thermal dimensional stability (° C.) |
|---|---|---|---|---|
| 1 | Good | 0.97 | 1.356 | 70 |
| 2 | do | 0.89 | 1.358 | 69 |
| 3 | Fair | 0.90 | 1.367 | 74 |
| 1A | Poor | 0.88 | 1.341 | 65 |
| 4 | do | 0.89 | 1.360 | 72 |
| 4A | Very poor | 0.86 | 1.338 | 66.0 |

It is evident that the shaped bodies of polyethylene terephthalate produced in the injection mold process, according to Examples 1 to 4, of the present invention, in the worst case still show a difference in density of +0.015 g./cm.³ as compared to the shaped bodies 1A and 4A, this means that their degree of crystallinity is at least twice as high as that of the shaped bodies 1A and 4A. In addition, the thermal dimensional stability of the shaped bodies 1 to 3 which was ascertained ranges 3 to 9° C. higher than that of the shaped bodies 1A and 4A. This also applies to the shaped body 4. By this, the non-equivalence of Ca, Sr and Ba on the one hand and Mg on the other hand was proven.

EXAMPLE 5

A mixture of 200 parts of terephthalic acid dimethylester, 160 parts of ethylene glycol, 0.1 part of a pulverized alloy of 40% calcium and 60% antimony and 0.1 part of a pulverized alloy of 50% antimony and 50% lead is heated with stirring in the absence of atmospheric oxygen and moisture. Methanol and ethylene glycol distill off at temperatures up to 250° C. within 2½ hours. Stirring is continued for 2¾ hours at about 265° C. under a vacuum of 0.45–0.50 torr.

Pure nitrogen is conducted into the reaction vessel under atmospheric pressure and samples of the reaction product are taken. The polyester is completely colorless, melts at 257–259° C. and has the intrinsic viscosity of 0.64 dl./g. The temperature was increased to 280° C. and stirring continued with further samples taken from time to time.

The following values for the intrinsic viscosity were obtained:

0.64 dl./g. after 15 minutes
0.63 dl./g. after 30 minutes
0.63 dl./g. after 1 hour
0.63 dl./g. after 2 hours Apart from the essentially constant intrinsic viscosity values the excellent color stability was remarkable.

For the purpose of comparison a polyester is condensed by using the same conditions as above mentioned with the exception that 0.2 part of a catalyst is used consisting of 80% antimony and 20% calcium. With equal times for reesterification and polycondensation an intrinsic viscosity of only 0.47 dl./g. is achieved. A sample of the polyester obtained shows a greyish color.

EXAMPLE 6

The proceeding of Example 5 is adopted except that 0.1 part of a pulverized alloy of 50% antimony and 50% lead and 0.1 part calcium turnings are employed. A colorless polyester is obtained melting at 258–260° C. and having an intrinsic viscosity of 0.69 dl./g. Stirring of the polyester melt is continued at 280° C. with further samples taken from time to time.

The following values for the intrinsic viscosity were determined:

0.69 dl./g. after 15 minutes
0.69 dl./g. after 30 minutes
0.68 dl./g. after 1 hour
0.68 dl./g. after 2 hours

EXAMPLE 7

The proceeding of Example 5 is adopted except that 0.2 part of a pulverized alloy of 40% antimony, 40% lead and 20% calcium is employed. A colorless polyester is obtained having a melting point of 257–259° C. and an intrinsic viscosity of 0.64 dl./g.

Stirring of the polyester melt is continued at 280° C. under nitrogen and the following intrinsic viscosity values were determined:

0.63 dl./g. after 15 minutes
0.63 dl./g. after 30 minutes
0.63 dl./g. after 1 hour
0.62 dl./g. after 2 hours

EXAMPLE 8

The proceeding of Example 5 is adopted except that 0.1 part of a pulverized alloy of 60% antimony and 40% lead and a solution of 0.1 part calcium in 10 parts of ethylene glycol is used. A colorless polyester is obtained having a melting point of 257–260° C. and an intrinsic viscosity of 0.68 dl./g. The following intrinsic viscosity values were obtained:

0.68 dl./g. after 15 minutes
0.67 dl./g. after 30 minutes
0.67 dl./g. after 1 hour
0.67 dl./g. after 2 hours

EXAMPLE 9

A mixture of 3880 parts of terephthalic acid dimethylester and 3100 parts of ethylene glycol is heated in the presence of 2.91 parts of a pulverized alloy of 35% antimony, 35% lead and 30% calcium with stirring in the absence of atmospheric oxygen and moisture. Methanol and ethylene glycol distill off at temperatures up to 256° C. within 5 hours. Stirring is continued for 6 hours at a temperature of 267–270° C. under a vacuum of 0.9 to 0.25 torr. The obtained polyester is white, has an intrinsic viscosity of 0.72 dl./g. and a melting point of 258° C. The crystallization temperature is 132° C. and the crystallization rate—expressed by the relation number obtained from the diagram of the differential colorimetric analysis—is 3.00.

EXAMPLE 10

A mixture of 5000 parts terephthalic acid dimethylester and 4000 parts of ethylene glycol is heated with stirring under nitrogen in the presence of 1.25 part calcium being added in the form of a solution in 125 parts ethylene glycol and in the presence of 3.75 parts of a finely pulverized alloy of 60% antimony and 40% lead. Methanol and ethylene glycol distill off at temperatures up to 243° C. within 4½ hours. Stirring is continued for 6 hours at 267° C. to 268° C. under a vacuum of 0.7 to 0.9 torr. The obtained polyester is white, has an intrinsic viscosity of 0.81 dl./g. and a melting point of 256° C. The crystallization temperature is 134° C. and the crystallization rate is 3.18. The density of the test cups is 1,383.

EXAMPLE 11

A mixture of 3880 parts of terephthalic acid dimethylester and 3100 parts of ethylene glycol is heated with stirring in the absence of atmospheric oxygen and in the presence of 1.14 parts of a pulverized alloy of 60% antimony and 40% lead sieved to yield a grain size of less than $25\mu$ and 1.14 parts of strontium in the form of a solution of the metal in ethylene glycol. Methanol and ethylene glycol distill off at temperatures of up to 250° C. within 4 hours. Stirring is continued for 6½ hours at 274–277° C. and 0.3–0.6 torr.

The colorless polyester thus obtained has an intrinsic viscosity of 0.94 dl./g., a melting point of 259° C. and a crystallization temperature of 137° C.

EXAMPLE 12

A mixture of 3880 parts of terephthalic acid dimethylester and 3100 parts of ethylene glycol is heated with stirring in the absence of atmospheric oxygen and in the presence of 1.52 parts of a pulverized alloy of 60% antimony and 40% lead being sieved to yield a grain size of less than $25\mu$ and 1.14 parts of barium in the form of a solution of the metal in ethylene glycol. Methanol and ethylene glycol distill off at temperatures up to 250° C. within 4 hours. Stirring is continued for 5½ hours at 274–277° C. under a vacuum of 0.3–0.6 torr. The colorless polyester thus obtained has an intrinsic viscosity of 0.93 dl./g., a melting point of 258° C. and a crystallization temperature of 134° C.

EXAMPLE 13

A mixture of 3880 parts of terephthalic acid dimethylester and 3100 parts of ethylene glycol is heated with stirring in the absence of atmospheric oxygen and in the presence of 1.14 parts of an alloy of 60% antimony and 40% lead in the form of a solution obtained by heating the alloy in the presence of air in ethylene glycol and 0.60 part of calcium in the form of a solution of the metal in ethylene glycol. Methanol and ethylene glycol distill off at temperatures up to 250° C. within 4 hours. Stirring is continued for 5½ hours at 274–277° C. under a vacuum of 0.3–0.6 torr. The colorless polyester thus obtained has an intrinsic viscosity of 0.96 dl./g., a melting point of 258° C. and a crystallization temperature of 138° C.

EXAMPLE 14

A mixture of 3860 parts of terephthalic acid dimethylester and 3100 parts of ethylene glycol is heated with stirring in the absence of atmospheric oxygen and in the presence of 1.52 parts of a mixture of 60% antimony and 40% lead in the form of a solution obtained by heating in ethylene glycol in the presence of air and 0.90 part of barium in the form of a solution of the metal in ethylene glycol. Methanol and ethylene glycol distill off at temperatures up to 250° C. within 4 hours. Stirring is continued for 5½ hours at 274–277° C. under a vacuum of 0.3–0.6 torr. The colorless polyester thus obtained has an intrinsic viscosity of 0.91 dl./g., a melting point of 259° C. and a crystallization temperature of 136° C.

EXAMPLE 15

A mixture of 3880 parts of terephthalic acid dimethylester and 3100 parts of ethylene glycol is heated with stirring in the absence of atmospheric oxygen and in the presence of 1.26 parts of antimony trioxide, 0.72 part of lead acetate and 2.7 parts of calcium acetate. Methanol and ethylene glycol distill off at temperatures up to 250° C. within 4 hours. Stirring is continued for 5½ hours at 274–277° C. and 0.3–0.6 torr. The colorless polyester thus obtained has an intrinsic viscosity of 0.88 dl./g., a melting point of 256° C. and a crystallization temperature of 135° C.

EXAMPLE 16

A mixture of 3880 parts of terephthalic acid dimethylester and 3100 parts of ethylene glycol is heated with stirring in the absence of atmospheric oxygen and in the presence of 1.7 parts of antimony trioxide, 0.9 part lead acetate and 1 part barium acetate. Methanol and ethylene glycol distill off at temperatures up to 250° C. within 4 hours. Stirring is continued for 6 hours at 274–277° C. and 0.3–0.6 torr. The colorless polyester thus obtained has an intrinsic viscosity of 0.92 dl./g., a melting point of 255° C. and a crystallization temperature of 140° C.

EXAMPLE 17

A mixture of 3880 parts of terephthalic acid dimethylester and 3100 parts of ethylene glycol is heated with stirring in the absence of atmospheric oxygen and in the presence of a pulverized alloy of 80% antimony and 20% lead being sieved to yield a grain size of less than 25μ and 0.38 part of calcium in the form of a solution of the metal in ethylene glycol. Methanol and ethylene glycol distill off at temperatures up to 250° C. within 4 hours. Stirring is continued for 5½ hours at 274–277° C. and 0.3–0.6 torr. The colorless polyester thus obtained has an intrinsic viscosity of 0.93 dl./g., a melting point of 257° C. and a crystallization temperature of 139° C.

EXAMPLE 18

A mixture of 3880 parts of terephthalic acid dimethylester, 3100 parts of ethylene glycol and 158 parts of bisphenol-A-diglycolether is heated with stirring in the absence of atmospheric oxygen and in the presence of 1.52 parts of a pulverized alloy of 60% antimony and 40% lead which has been sieved to yield a grain size of less than 25μ (the catalyst may as well be used in a particle size of up to 200μ) and 1.14 parts of calcium in the form of a solution of the metal in ethylene glycol. Methanol and ethylene glycol distill off at temperatures up to 250° C. within 4 hours. Stirring is continued for 5½ hours at 274–277° C. and a vacuum of 0.3 to 0.5 torr. The colorless polyester thus obtained has an intrinsic viscosity of 0.88 dl./g., a melting point of 251° C. and a crystallization temperature of 145° C. The granulate is dried to a water content of 0.01% at the most and was formed to drinking-cups by use of a conventional injection-molding machine (mold temperature 145° C.). The cups were easily deformable and homogenously crystallized. They showed inherent stability and did not shrink even when heated in air of 140° C. for 30 minutes.

EXAMPLE 19

A mixture of 3880 parts of terephthalic acid dimethylester, 3100 parts of ethylene glycol, 120 parts of 2,2-bis-[4'-β-hydroxy ethoxy phenyl]-propane and 2.72 parts of pentaerythritol is heated with stirring in the absence of atmospheric oxygen and in the presence of 1.14 parts of a pulverized alloy of 60% antimony and 40% lead being sieved to yield a grain size of less than 25μ (the catalyst may as well be used in a particle size of up to 200μ) and 0.38 part of calcium turnings. Methanol and ethylene glycol distill off at temperatures up to 250° C. within 4 hours. Stirring is continued for 4½ hours at 274–277° C. and a vacuum of 0.3–0.6 torr. The colorless polyester thus obtained has an intrinsic viscosity of 0.71 dl./g., a melting point of 235° C. and a crystallization temperature of 148° C. The granulate was dried to a water content of less than 0.01% and worked into drinking cups by use of a conventional injection molding machine (mold temperature 145° C.).

EXAMPLE 20

A mixture of 400 parts of terephthalic acid dimethylester and 650 parts of 1,4-bis-/hydroxymethyl/-cyclohexane is heated with stirring in the absence of atmospheric oxygen and in the presence of 0.1 part of a pulverized alloy of 60% antimony and 40% lead which has been sieved to yield a grain size of less than 25μ (the alloy may as well be used with a particle size up to approximately 200μ) and 0.1 part of calcium in the form of a solution of the metal in ethylene glycol. Methanol distills off first and when the temperature is increased to 260–280° C. cyclohexanedimethanol distills off too. Finally polycondensation takes place at temperatures of 295 to 305° C. and a vacuum of 0.3 to 0.5 torr. After 5 hours a polyester is obtained having a melting point of 285–289° C. and an intrinsic viscosity of 0.70 dl./g. Crystallized shaped articles showing inherent stability may be obtained by injection-molding.

What is claimed is:

1. Thermoplastic polyester molding mass suitable for injection molding and for extrusion of rods, bars and profiles comprising a polyester at least 85 mol percent of which is composed of the monomeric units of the formula

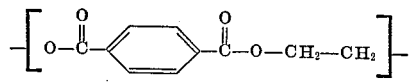

and up to 15 mol percent of which is composed of the monomeric units of the formula

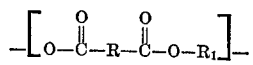

wherein R is a divalent radical of the group of the arylene radicals with 1 to 2 benzene rings and 6 to 18 carbon atoms or of the group of the alkylene radicals with 2 to 8 carbon atoms and $R_1$ is a divalent radical of the group of the alkylene radicals with 2 to 10 carbon atoms,

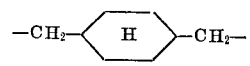

or

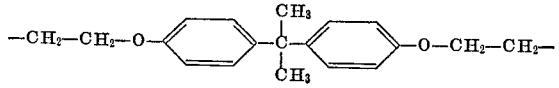

0.001 to 0.8 percent by weight of antimony, 0.005 to 0.7 percent by weight of lead and 0.005 to 0.7 percent by weight of an alkaline earth metal selected from the group consisting of calcium, strontium and barium, said percent by weight being based on the polyester.

2. Thermoplastic molding mass according to claim 1 consisting of up to 1 mol percent of co-components with a branching and cross-linking effect.

3. Thermoplastic polyester molding mass suitable for injection molding and for extrusion of rods, bars and profiles comprising a polyester at least 85 mol percent of which is composed of monomeric units of the formula

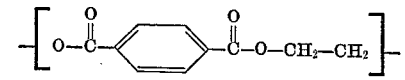

and up to 15 mol percent of which is composed of monomeric units of the formula

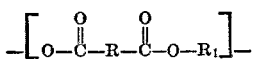

wherein R is a divalent radical selected from the group consisting of

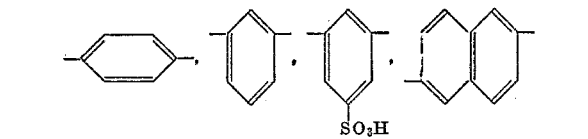

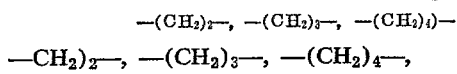

—$(CH_2)_2$—, —$(CH_2)_3$—, and —$(CH_2)_4$— and $R_1$ is a divalent radical selected from the group consisting of

—$(CH_2)_2$—, —$(CH_2)_3$—, —$(CH_2)_4$—

—$(CH_2)_2$—, —$(CH_2)_3$—, —$(CH_2)_4$—,

and

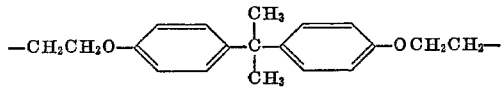

0.001 to 0.8 percent by weight of antimony, 0.005 to 0.7 percent by weight of lead and 0.005 to 0.7 percent by weight of an alkaline earth metal selected from the group consisting of calcium, strontium, and barium, said percent by weight being based on the polyester.

4. Thermoplastic molding mass according to claim 3 including up to 1 mol percent of branching and cross-linking agents selected from the group consisting of tricarballylic acid, trimellitic acid, dioxybenzoic acid, tartaric acid, 2,5-dioxy-terephthalic acid, glycerin, erythritol and pentaerythritol.

5. Thermoplastic molding mass according to claim 3 consisting of 100 mol percent of the monomeric unit

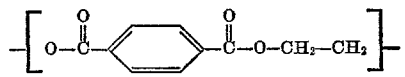

6. A process for the production of a thermoplastic polyester molding mass according to claim 1 by heating at least one low molecular dialkyl ester of a dicarboxylic acid selected from the group consisting of aromatic dicarboxylic acids containing 1 or 2 benzene rings and 8 to 20 carbon atoms, and aliphatic dicarboxylic acids containing 4 to 10 carbon atoms, with at least one diol selected from the group consisting of alkane diols containing 2 to 10 carbon atoms, 1,4-bis-[hydroxymethyl]-cyclohexane and 2,2-bis-[4'-β-hydroxyethoxyphenyl]-propane to 100 to 250° C. in the presence of 0.001 to 0.8 percent by weight of antimony, 0.005 to 0.7 percent by weight of lead and 0.005 to 0.7 percent by weight of an alkaline earth metal selected from the group consisting of calcium, strontium and barium, distilling off of the low molecular alkanol to form monomeric diglycol esters and heating said esters at temperatures of 200 and 360° C. in vacuum under subatmospheric pressure and in the presence of an inert gaseous atmosphere until the desired degree of polycondensation of the thermoplastic polyester molding mass is reached.

7. A process for the production of a thermoplastic polyester molding mass according to claim 6 characterized in that ester interchange and polycondensation are carried out in the presence of up to 1 mol percent of co-components having a branching and cross-linking effect.

References Cited
UNITED STATES PATENTS
3,028,366   4/1962   Engle et al.
3,057,828   10/1962  McNeil.

MELVIN GOLDSTEIN, Primary Examiner

U.S. Cl. X.R.
260—47 C